Aug. 14, 1934.  W. M. CHARMAN  1,969,726
HOT TOP
Filed Sept. 17, 1931  2 Sheets-Sheet 1
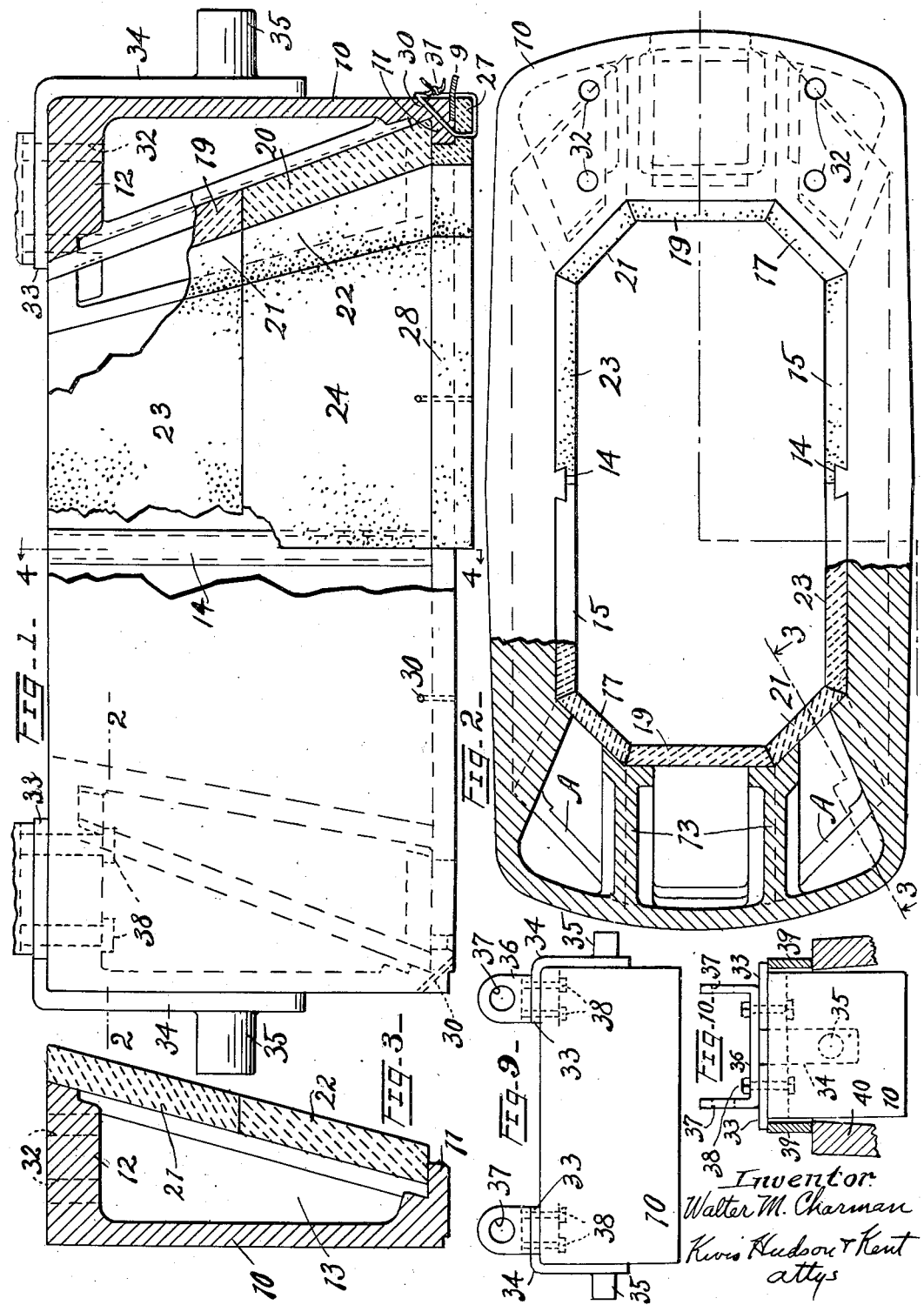

Aug. 14, 1934.  W. M. CHARMAN  1,969,726
HOT TOP
Filed Sept. 17, 1931   2 Sheets-Sheet 2
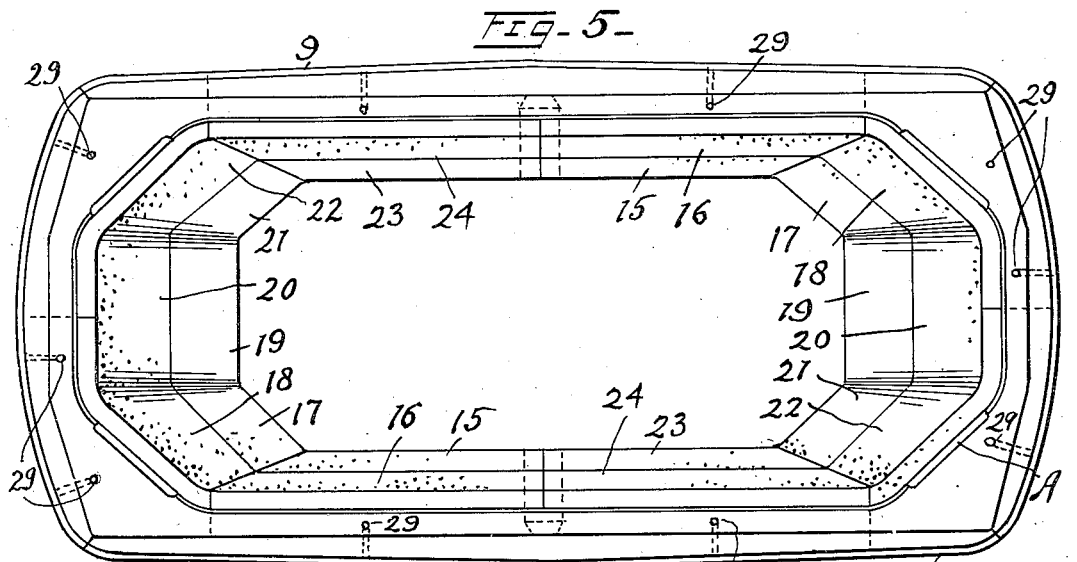
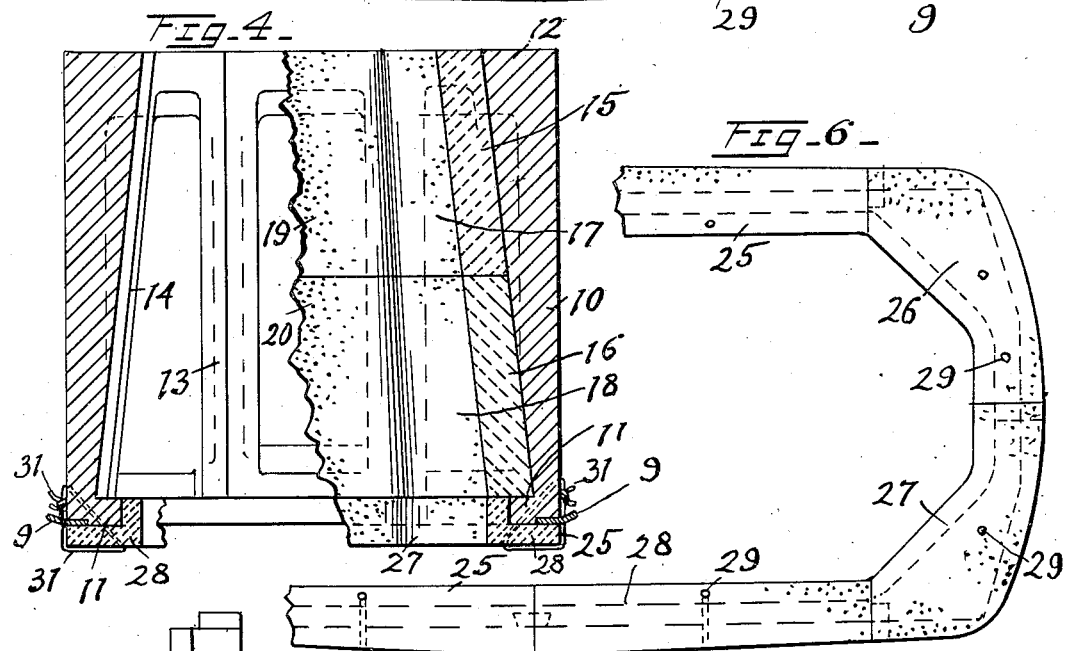
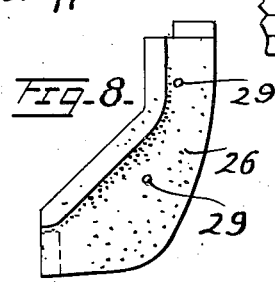
Inventor
Walter M. Charman
Kwis Hudson & Kent
attys.

Patented Aug. 14, 1934

1,969,726

UNITED STATES PATENT OFFICE 1,969,726

HOT TOP

Walter M. Charman, Cleveland Heights, Ohio

Application September 17, 1931, Serial No. 563,241

16 Claims. (Cl. 22—147)

This invention relates to improvements in hot tops, that is to say, hot tops for ingot molds.

One of the objects of the invention is the provision of a hot top adapted to reduce considerably the cubical contents thereof as compared with that of previously known hot tops.

Another object is the provision of a hot top of such character as to permit great variance in pouring heights for a given ingot mold, with corresponding wide variations in ingot weights.

Another object is the provision of a hot top having vertical outer walls which will not be gripped by metal rising into the space between the mold and the side walls of the hot top, while the inner walls are tapered upwardly for the double purpose of reducing the cubical contents of the hot top and of facilitating the operation of stripping the hot top from the ingot.

A further object of the invention is the provision of a metal casing having inwardly extending webs and an upper flange to present a backing for the lining elements, which are thereby set at an inclination to the vertical.

Another object is the provision of removable trunnions, whereby the trunnions need not interfere with the insertion of the hot top into the mold as far as may be desired.

Still another object is the provision of special means combining with the upper flange of the hot top casing for removably supporting the trunnions.

Other objects and features of novelty will appear as I proceed with the description of that embodiment of the invention which, for the purposes of the present application, I have illustrated in the accompanying drawings, in which Figure 1 is an elevational view, partly in vertical section, of a hot top embodying the invention.

Fig. 2 is a top plan view of the same, a portion of the figure being shown in horizontal section taken substantially along the line 2—2 of Fig. 1.

Fig. 3 is a vertical sectional view of one end of the hot top with the lower course lining removed, the view being taken substantially along the line 3—3 of Fig. 2.

Fig. 4 is a vertical transverse sectional view taken substantially along the line 4—4 of Fig. 1, a portion of the lining being broken away to more clearly illustrate the invention.

Fig. 5 is a bottom plan view of the hot top with the lower lining removed.

Fig. 6 is a fragmental bottom plan view of the lower lining.

Figs. 7 and 8 are detailed views of two of the lining blocks of the lower course.

Fig. 9 is a side elevational view on a smaller scale, showing the hot top with trunnions, handle brackets, and block engaging plates attached thereto, and Fig. 10 is an end elevation of the same, showing a fragment of a mold into which the hot top is projected.

Similar reference characters refer to like parts throughout the views.

In the drawings I have illustrated the invention as applied to a hot top for use in connection with slab molds, although in its broader aspects the invention is equally applicable to rectangular molds of the more usual forms. In the structure illustrated there is a casing 10, which may be formed as a single casting or as a plurality of castings suitably secured together. The outer walls of the casing are vertical, or substantially so, and are adapted to be inserted to any desired height into the upper end of an ingot mold, whether of the big end up or little end up type.

Suitable means are provided for the support of the lining elements which, in the case illustrated, take the form of a ledge 11 extending inwardly throughout the perimeter of the casing. The width of this ledge is substantially uniform throughout its extent except at the four corners of the casing, where it is extended further inwardly so that its inner edge follows a line extending diagonally between adjacent side and end portions, as indicated at A in Figs. 2 and 5. Along the upper edge of the casing there is an inturned flange 12 which, in the present instance, is relatively narrow along the side walls of the casing, and relatively wide along the end walls thereof. There are also inwardly extending webs 13 at the ends of the casing arranged in two vertical planes and an inwardly extending web 14 on each side wall of the casing, these latter webs, in the form of the invention herein disclosed, being arranged in a vertical plane which separates the hot top into two equal parts. The web 14 has a dove-tail form which is adapted to fit semidove-tail grooves in adjoining upper lining elements.

Although the webs 13 and 14 are here shown as integral with the casing, it will be readily appreciated that they can be formed separately, so as to be removable and replaceable in case they should become burnt or broken, thereby saving the scrapping of the entire casing in such event.

The lining above the ledge 11 is preferably formed in two courses although obviously it could be made in one or more than two courses if desired. When formed in two courses there are ten different blocks or shapes numbered 15 to 24 inclusive, on the drawings. The blocks 15, 16, 23 and 24, as explained above, are each formed along one side edge with rabbets of half dove-tail shape for engagement with the web 14. Their opposite edges are beveled. The blocks 17, 18, 21 and 22 are beveled on both edges and are tapered toward the top. The blocks 19 and 20 are beveled on both edges but their edges are parallel.

In assembling the lining on one side of the two webs 14, the blocks 16, 18, 22 and 24 are put in place, resting upon the ledge 11. The block 20 is then slid down between the blocks 18 and 22. All of the blocks of the course are thus locked or wedged in position, assuming that the casing remains right side up. The procedure with the upper course is the same, that is to say, the block 19 is the one placed in position last. Cement is then applied to the joints between blocks, and they are all coated with suitable compound to protect them and produce good parting surfaces. The lining upon the opposite side of the web 14 is of identically the same form, and is assembled and treated in precisely the same manner. Either half of the lining may be removed and replaced without disturbing the other half. The upper lining, that is the lining above the ledge 11, is semi-permanent. Below the ledge 11 there is a temporary lining course which must be removed after each casting operation. It protects the lower edge of the casing and forms a means of parting between the ingot and the casing. This course is preferably constructed of a series of refractory blocks numbered 25, 26, 27 and 28. They are provided with holes 29 which register with diagonally arranged holes 30 in the casing for the reception of wire ties 31 or the like, by means of which the blocks are attached to the casing. At the ends of these lower course lining blocks there are interfitting projections and sockets, which assist the ties 31 and the engagement of the blocks behind the ledge 11 in holding the blocks in position. When the hot top is stripped from the ingot, the lower course lining blocks adhere thereto and the ties 31 break or pull out, as explained more particularly in Charman et al. Patents No. 1,804,204 and No. 1,804,206, dated May 5, 1931. The present invention is not concerned with the detail of this lower course lining, and variations in its form, material and method of attachment are within the contemplation of the invention.

Around the entire perimeter of the hot top I mount a wiper strip 9 that is designed to prevent or dam the flow of molten metal upwardly through the space between the inner surface of the ingot mold and the outer wall of the casing 10. While this wiper strip may take various forms, I prefer to construct it of flexible sheet metal of the general form and character described in Charman et al. Patent No. 1,804,207, dated May 5, 1931.

In servicing hot tops between casting operations, it is necessary or desirable to mount them in a support or carriage, such that they may be swung around and inverted. It is also necessary to provide handling brackets or projections of some kind, by means of which the hot top may be grasped when it is to be stripped from the ingot, and by means of which it may be carried by a crane or the like from one location to another. Projections must also be provided which will be adapted to rest upon wooden blocks or the like supported on the top of the mold while the metal is being poured, this being the means which serves to determine the depth of insertion of the hot top into the mold, and therefore the height and weight of the ingot. Ordinarily the trunnions, handling means and block engaging projections are carried by the side walls of the casing. In my improved hot top, however, all of these elements are mounted on the top of the casing, the trunnions proper being carried by angular arms which project downwardly over the sides or ends of the casing. Hence by making the trunnions removable the side and end walls of the casing are left entirely flush, and the hot top may be projected down into the mold as far as may be desired and a great variation in ingot size may thereby be accomplished.

In the present instance, this feature of the invention is carried out as illustrated particularly in Figs. 9 and 10. The end portions of the upper flange 12 of the casing have bolt holes 32 formed therethrough. Flat plates 33 each have two holes formed therethrough which are adapted to be aligned with the holes 32. When so positioned, these plates extend outwardly beyond the side walls of the casing, and their inner ends are separated as shown in Fig. 10. The horizontal portion of an angular arm 34 sets between each pair of plates 33, and its vertical portion is caused to bear against the end wall of the casing, where near its lower extremity, it carries a trunnion 35. At each end of the casing above the plates 33 and the arm 34 I mount a handling bracket 36, which consists of a flat horizontal portion with upturned ends having holes 37 therethrough for the reception of a bar, hooks or other handling devices. The bracket 36 is provided with perforations so positioned as to align with the two sets of perforations in the flange 12 of the casing. Bolts 38 extend through the parts 36, 33 and flange 12 for holding the first named parts in operative position. Of course, when the nuts on these bolts are loosened sufficiently, the angular arms 34 may be withdrawn from beneath the bracket 36, and the trunnions thereby removed from the casing, after which the hot top may be lowered into the mold below the trunnion level, as indicated in Fig. 10. However, should it be desired, the above arrangement may be utilized to bring about the result that when the bolts 38 are tightened up by means of their nuts, the angular arms 34 may be held permanently in position. It may be desirable to utilize the construction in this manner where comparatively small adjustments of the hot top are sufficient. In Fig. 10 the wooden or other blocks 39 are shown in position upon an ingot mold 40 for supporting the hot top temporarily, these blocks engaging the exposed outer ends of plates 33.

It will be observed that by building inwardly the corners of the ledge 11, and by extending the upper flange 12 a considerable distance inwardly at the ends of the casing, so that the lining blocks at the ends incline sharply, the cubical contents of the hot top are greatly reduced from what they would be otherwise. This is a distinct advantage, inasmuch as the metal within the hot top ordinarily must be cropped off from the ingot. Furthermore, the air spaces enclosed by the casing to the rear of the upper lining blocks assist in retaining the heat of the metal in the hot top until the tendency to form piping in the ingot has passed. Also, as above stated, the flange at the top of the casing lends itself well to the removable mounting of the trunnions.

It should be understood that it is within the purview of the invention to fill the large air spaces at the ends, or the small air spaces at the sides, or both, with refractory insulating material, although the hollow casing with air spaces is preferred. It should also be understood, as previously indicated, that large spaces may be used along the sides as well as at the ends of the hot top, if desired.

In accordance with this invention the entire cross sectional area of the metal in the hot top may be considerably reduced as compared with the cross section of the ingot proper. Furthermore, if desired, the reduced hot top area effected by the use of the invention may be utilized to secure greater height of metal in the hot top, thereby obtaining much higher "head pressure" of metal, which effects better hot topping, that is to say it more efficiently precludes the formation of piping. By this means it is possible to withdraw the area of segregation in a steel ingot away from the main body of the ingot, while expending no more steel than would be necessary were the commonly known straight-walled clay hot top employed.

In the foregoing description I have necessarily gone somewhat into detail in order to explain fully the particular embodiment of the invention herein illustrated, but I desire it to be understood that such detailed disclosures are not to be construed as amounting to limitations except as they may be included in the appended claims.

Having thus described my invention, I claim:

1. In a hot top, a casing, a pair of trunnions with their axis near the center of gravity of the hot top, a pair of handling brackets at the top of the casing, and means associated with said brackets for removably attaching said trunnions to said casing.

2. In a hot top, a metal casing, a trunnion therefor having an arm overlying the top of the casing, a handling bracket overlying said arm, and means for removably attaching said handling bracket to the casing whereby said trunnion is also removably attached.

3. In a hot top, a casing adapted to extend downwardly into an ingot mold, and a pair of trunnions therefor adapted to extend outwardly therefrom, and means mounted at the top of the casing entirely within the perimeter thereof for detachably securing said trunnions thereto.

4. In combination, a hot top comprising a casing adapted to extend downwardly into an ingot mold, blocking plates, trunnions and handling brackets therefor, and common means mounted entirely within the perimeter of the casing for securing said plates and brackets thereto, and for removably securing said trunnions to said casing.

5. In a hot top, a casing having substantially vertical outer walls and having an inwardly extending flange at its upper extremity to provide backing for lining elements set within the casing along inwardly and upwardly inclined planes, a pair of removable trunnions adapted to extend outwardly from opposite sides of the casing along an axis near the center of gravity thereof, and means mounted within said flange for removably attaching said trunnions to the casing.

6. In a hot top, a casing having substantially vertical outer walls and an inwardly extending upper flange, angle arms adapted to fit over the top and side walls of the casing, a trunnion carried by the vertical portion of each angle arm, and means mounted in said flange for releasably holding said angle arms in operative position.

7. In a hot top, a casing having inner surfaces tapered upwardly, a pair of abutment webs formed on the inner wall of the casing in vertical planes, a series of lining blocks mounted on the casing, the side edges of said blocks engaging each other to prevent movement of the blocks inwardly except at the webs where they engage the webs for a like purpose, and means for supporting the lower edges of the blocks, whereby the said lining blocks to one side of the webs may be removed or replaced without disturbing the lining blocks upon the other side thereof.

8. A hot top of the floating type adapted to extend downwardly into an ingot mold and be supported by an ingot therein, said hot top having outer vertical surfaces and inner surfaces inclined inwardly and upwardly, the area enclosed by the hot top being constricted on two opposite sides thereof to a greater extent than on the two intermediate sides thereof.

9. In a hot top of the floating type, a casing adapted to extend downwardly into an ingot mold and be supported by an ingot therein, said casing having vertical outer surfaces means upon said casing for supporting lining elements, said elements in their mounted positions having inner surfaces inclined inwardly and upwardly, the inner surfaces on two opposite sides of the hot top being extended inwardly a greater average distance than those on the two intermediate sides.

10. In a hot top of the floating type, a casing having vertical outer surfaces, refractory lining material supported thereupon, the cross sectional area of the hot top wall at the bottom of the hot top being less than the cross sectional area of the said wall at the top of the hot top, the total average width of the casing and lining material being greater on two opposite sides of the hot top than the total average width of the casing and lining material on the two intermediate sides thereof.

11. A hot top for slab ingot molds, adapted to extend downwardly into the mold and be supported by an ingot therein, said hot top having inner surfaces inclined inwardly and upwardly, the inner end walls of the hot top being inclined inwardly at a greater angle than the inner side walls thereof.

12. A hot top for slab ingot molds, adapted to extend downwardly into the molds and be supported by an ingot therein, said hot top having a lower internal ledge projecting inwardly substantially the same distance at the ends and sides thereof, the inner end walls of the hot top being inclined inwardly at a greater angle than the inner side walls thereof.

13. In a hot top of the floating type for slab molds, adapted to extend downwardly into a slab mold and be supported by an ingot therein, said hot top comprising a metallic casing, said hot top having an outer surface conforming substantially in horizontal contour with the inner contour of the mold with which the hot top is to be used, and comprising an inner refractory lining of preformed rigid blocks supported upon the casing at the lower end thereof, which diverges upwardly away from the outer surface of the casing, the volumetric content of the hot top between the inner and outer surfaces thereof per unit of perimetric length being materially greater at the ends than at the sides of the hot top.

14. In a hot top of the floating type for slab molds, adapted to extend downwardly into a slab mold and be supported by an ingot therein, said hot top having an outer surface conforming substantially in horizontal contour with the inner contour of the mold with which the hot top is to be used, and having an inner wall which diverges upwardly from the outer wall, the volumetric content of the hot top between the inner and outer surfaces thereof per unit of perimetric length being materially greater at the ends than at the sides of the hot top.

15. In a hot top of the floating type for slab molds, adapted to extend downwardly into a slab mold and be supported by an ingot therein, said hot top having an outer surface conforming substantially in horizontal contour with the inner contour of the mold with which the hot top is to be used, and having an inner surface which diverges upwardly from the lower end of the outer surface, the angle between the inner and outer surfaces of the hot top being materially greater at the ends thereof than at the sides thereof.

16. In a hot top of the floating type for slab molds, adapted to extend downwardly into a slab mold and be supported by an ingot therein, said hot top comprising a metallic casing having upright outer walls, a lower ledge, and an inwardly extending flange at its upper extremity, said casing also having a plurality of ribs extending upwardly from the ledge to the flange and having inner edges inclined upwardly and inwardly, and a lining of preformed rigid refractory blocks mounted within the casing, said lining being supported upon said ledge, engaging said ribs and said flange, whereby a plurality of dead air spaces are provided within the casing between the outer wall thereof and the said lining.

WALTER M. CHARMAN.